(12) United States Patent
Logie et al.

(10) Patent No.: US 11,176,372 B2
(45) Date of Patent: Nov. 16, 2021

(54) AUTOMATIC CROP HEALTH CHANGE DETECTION AND ALERTING SYSTEM

(71) Applicant: Farmers Edge Inc., Winnipeg (CA)

(72) Inventors: Gordon Stuart James Logie, Winnipeg (CA); Guy Dion Duke, Lethbridge (CA)

(73) Assignee: Farmers Edge Inc., Winnipeg (CA)

( * ) Notice: Subject to any disclaimer, the term of this patent is extended or adjusted under 35 U.S.C. 154(b) by 204 days.

(21) Appl. No.: 16/452,199

(22) Filed: Jun. 25, 2019

(65) Prior Publication Data

US 2020/0005038 A1    Jan. 2, 2020

Related U.S. Application Data

(60) Provisional application No. 62/692,416, filed on Jun. 29, 2018.

(51) Int. Cl.
| | |
|---|---|
| *G06K 9/00* | (2006.01) |
| *G06T 7/11* | (2017.01) |
| *G06T 7/174* | (2017.01) |

(52) U.S. Cl.
CPC ............ *G06K 9/00657* (2013.01); *G06T 7/11* (2017.01); *G06T 7/174* (2017.01)

(58) Field of Classification Search
CPC ... G01N 2021/1797; G01N 2021/1765; G01N 2021/8466; G01N 21/27; G01N 21/31; G01N 21/35; G01N 21/84; G01N 21/8986; G01N 2223/618; G01N 2223/619; G01N 2223/621; G01N 33/02; G01N 33/46; G01N 33/0098; G06K 9/00; G06K 2209/17; G06T 2207/30128; A01G 7/00
See application file for complete search history.

(56) References Cited

U.S. PATENT DOCUMENTS

| | | |
|---|---|---|
| 6,212,824 B1 | 4/2001 | Orr et al. |
| 6,366,681 B1 | 4/2002 | Hutchins |
| 6,529,615 B2 | 3/2003 | Hendrickson et al. |
| 7,058,197 B1 | 6/2006 | McGuire et al. |
| 9,113,590 B2 * | 8/2015 | Johnson ............... A01B 79/005 |

(Continued)

FOREIGN PATENT DOCUMENTS

CA        2791562 A1    10/2010

OTHER PUBLICATIONS

International Search Report and Written Opinions, PCT/CA2019/050803, dated Jul. 2019, 8 pages.

*Primary Examiner* — Duy M Dang

(74) *Attorney, Agent, or Firm* — Ryan W. Dupuis; Kyle R. Satterthwaite; Ade & Company Inc.

(57) ABSTRACT

A method and system for crop health change monitoring is provided. The method includes acquiring a companion image of a crop growing within a field at a first point in time, acquiring a master image of the crop growing within the field at a second point in time, and computing, using a processor, vegetation indices using the master image and the companion image, determining, using the processor, regions of change within the master image using the vegetation indices and generating an alert indicative of a change in crop condition of the crop growing within the field, and communicating the alert indicative of the change in crop condition over a network to a computing device configured to receive the alert.

14 Claims, 7 Drawing Sheets

(56) References Cited

U.S. PATENT DOCUMENTS

| | | |
|---|---|---|
| 9,638,678 B2 | 5/2017 | Shriver et al. |
| 9,734,400 B2 * | 8/2017 | Shriver .............. G06K 9/00657 |
| 2008/0097653 A1 | 4/2008 | Kaprielian et al. |
| 2012/0101784 A1 | 4/2012 | Lindores et al. |
| 2014/0035752 A1 | 2/2014 | Johnson |
| 2015/0057817 A1 | 2/2015 | Endrizzi et al. |
| 2015/0130936 A1 | 5/2015 | Coram et al. |
| 2016/0019560 A1 | 1/2016 | Benkert et al. |
| 2016/0232621 A1 | 8/2016 | Ethington et al. |

* cited by examiner

AUTOMATIC CROP HEALTH CHANGE DETECTION AND ALERTING SYSTEM

PRIORITY STATEMENT

This application claims priority to U.S. Provisional Application No. 62/692,416, filed Jun. 29, 2018, hereby incorporated by reference in its entirety.

TECHNICAL FIELD

This description relates to the detection of changes in crop health condition within an agricultural field. More specifically, this description relates to the use of remotely-sensed image data for automatic detection of regions of change within the field.

BACKGROUND

Remotely-sensed image data and products derived from that data (i.e., imagery products) are increasingly utilized in agriculture. This is because these data products can provide rapid, synoptic estimates of crop health condition over a large number of agricultural acres. Crop health condition can be estimated using vegetation indices derived from the original image spectral data. One example vegetation index is the Normalized Difference Vegetation Index (NDVI), which can demonstrate high correlations with crop biomass, productivity, and eventual yield. NDVI and other imagery products can also provide quantitative and visual indications of deleterious crop conditions such as pest, disease, or weather damage (i.e., hail), as well as the presence of weeds.

Despite the utility offered by these imagery products, manual inspection of images can be very time consuming and tedious. This can be particularly true for growers operating very large farming operations. Manual inspection of images and imagery products can also require expertise and experience to properly interpret the data. As such, a method to automatically detect and highlight potential crop issues is desirable.

SUMMARY

This disclosure describes various methods and systems used for the detection and highlighting of areas of crop condition change within an agricultural field using remotely-sensed image data. In one example, the method involves the computation of vegetation indices from multi-date images, and then the performance of comparisons between these multi-date vegetation index images. Regions of change are detected using a minimum-change threshold. When these change regions meet specified criteria (such as a minimum area threshold), a notification (alert) can be sent to an agricultural grower, informing them of the change in crop condition, and allowing them to view the change regions and associated map layers.

According to one aspect, a method for crop health change monitoring is provided. The method includes acquiring a companion image of a crop growing within a field at a first point in time, acquiring a master image of the crop growing within the field at a second point in time, the first point in time prior to the second point in time, and computing, using a processor, vegetation indices using the master image and the companion image. The method further includes determining, using the processor, regions of change within the master image using the vegetation indices. If change within one or more of the regions of change is sufficient to meet defined criteria, the method provides for generating an alert indicative of a change in crop condition of the crop growing within the field between the first point in time and the second point in time. The method further includes communicating the alert indicative of the change in crop condition over a network to a computing device configured to receive the alert.

According to another aspect, a system for automatic crop health change detection and alerting is provided. The system includes an image filter module configured to receive as input observed images of an agricultural field taken from one or more remote sensing platforms and output filtered images, an image processing module configured to process the filtered image to provide derivative products, and a change detection module configured to receive as input the derivative products provided by the image processing module and detect changes in crop condition within the agricultural field, apply specified criteria to the changes in crop condition, and generate a notification if the specified criteria are met. The change detection module may be further configured to create a change image, flag pixels in the change image exceeding a change threshold, and remove contiguous groupings of change flagged pixels if smaller than a region size threshold. The change detection module may be configured to determine companion image candidates, compute class area change between a master image and candidate companion images and apply change thresholds, and select a final companion image from the candidate companion images. The derivative products may include computed vegetation indices computed from a master image amongst the observed images and a companion image amongst the observed images.

According to yet another aspect, a method for crop health change monitoring is provided. The method includes acquiring from at least one remote sensing platform a stack of images of a crop growing within a field and acquiring from a remote sensing platform a master image of a crop growing within the field. The method further includes selecting a companion image from the stack of images based on at least one candidate selection criteria wherein the at least one candidate selection criteria comprises a date range parameter and at least one of a minimum threshold for an average vegetation index value in the field, a maximum threshold for an average vegetation index value in the field, and a growth stage parameter. The companion image may be acquired at a first point in time and the master image may be acquired at a second point in time, the first point in time prior to the second point in time. The method further includes computing, using a processor, vegetation indices using the master image and the companion image and determining, using the processor, regions of change within the master image using the vegetation indices. If change within one or more of the regions of change is sufficient to meet defined criteria, the method provides for generating an alert indicative of a change in crop condition of the crop growing within the field between the first point in time and the second point in time. The method further provides for communicating the alert indicative of the change in crop condition over a network to a computing device configured to receive the alert, wherein the alert comprises a change alert image indicative of the change in crop condition of the crop growing within the field between the first point in time and the second point in time. The method further provides for displaying the change alert image indicative of the change in crop condition of the crop growing within the field on a display.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the disclosed principles. It is noted that wherever practicable, similar or like reference numbers may be used in the figures and may indicate similar or like functionality. The figures depict embodiments of the disclosed system (or method) for purposes of illustration only.

Overview

With an ever-growing number of available imaging platforms, it is increasingly possible for growers to get very high-frequency imagery of their fields. Commercial satellite platforms are now capable of offering sub-daily revisit frequencies, and the proliferation of commercial-grade unmanned aerial platforms allows growers to obtain their own imagery. However, this higher image frequency also means it can be impractical for growers to manually sort through and analyze all the available data obtained from their farms. Additionally, greater redundancy between images of a field can occur due to the higher revisit frequencies of imaging platforms, stemming from the fact that crop conditions generally remain stable over short time intervals (e.g., between subsequent revisits). Generally, a change in crop conditions between two instances in time (e.g., two images) will be of interest to the grower, while the crop condition remaining unchanged will not be.

To maximize the utility of high-frequency image data, described herein is a system for automatically detecting changes in the crop health condition within a field using derived image products. In a particular example, once a change in crop condition is detected, a notification may automatically be sent to the growers (or another third-party entity). A detailed description of the processes and algorithms utilized in this system follows below, including specific example implementations.

System Environment

Figure 1:
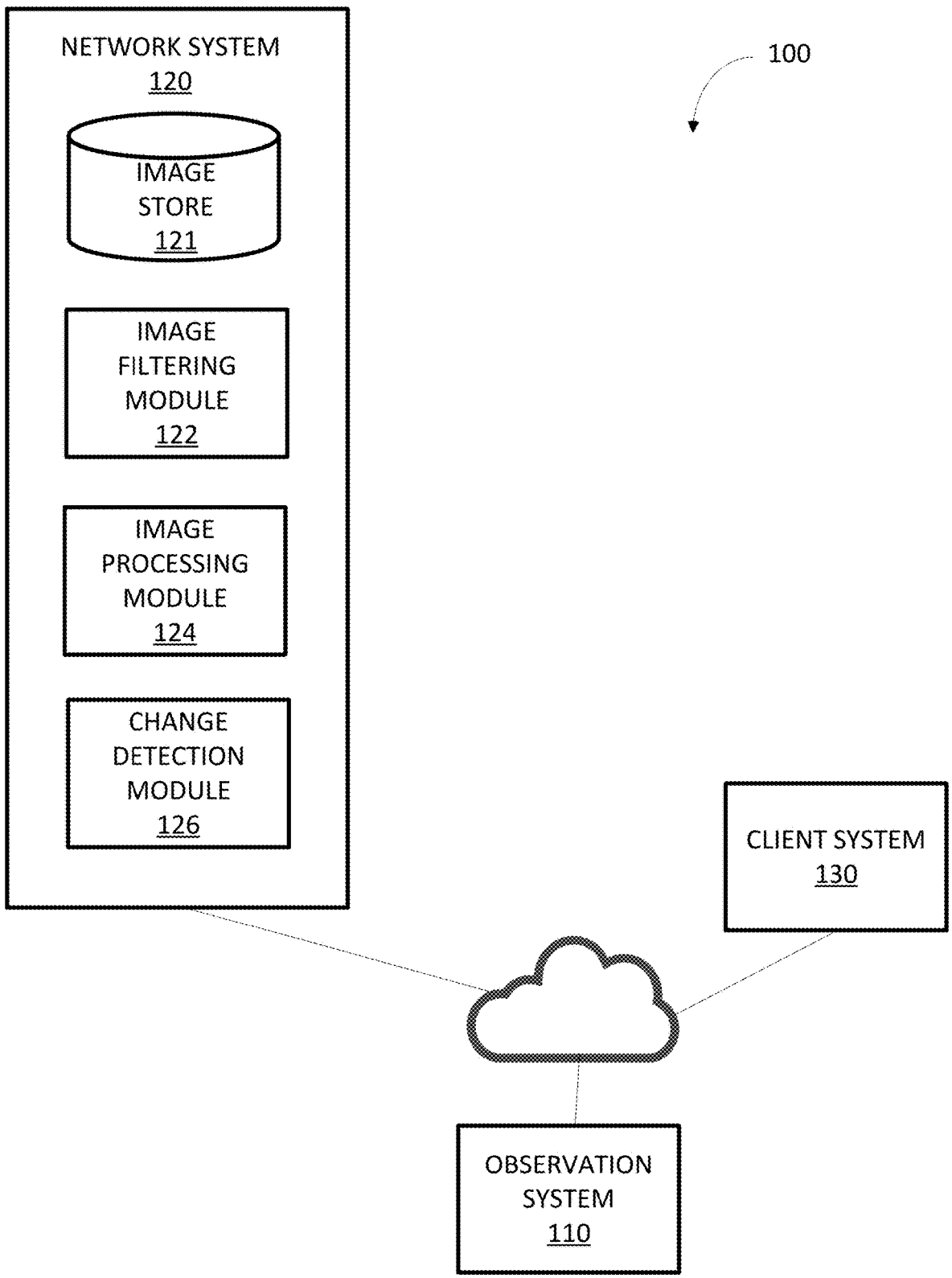
FIG. 1 illustrates a system environment for detection of crop health change over an agricultural field using remotely-sensed image products, according to one example embodiment.

FIG. 1 illustrates a system environment for detection of crop health change over an agricultural field using remotely-sensed image products, according to one example embodiment. Within the system environment 100 is an observation system 110, network system 120, client system 130, and a network 140 which links the different systems together. The network system 120 includes an image store 121, image filtering module 122, image processing module 123, and change detection module 124.

Other examples of a system environment are possible. For example, in various embodiments, the system environment 100 may include additional or fewer systems. To illustrate, a single client system may be responsible for multiple agricultural fields. The network system may leverage observations from multiple observation systems 110 to detect crop change for each of the agricultural fields. Furthermore, the capabilities attributed to one system within the environment may be distributed to one or more other systems within the system environment 100. For example, the change detection module 124 may be executed on the client system 110 rather than the network system 120.

An observation system 110 is a system which provides remotely-sensed data of an agricultural field. In an embodiment, the remotely-sensed data is an observed image. Herein, an observed image is an image or photograph of an agricultural field taken from a remote sensing platform (e.g., an airplane, satellite, or drone). The observed image is a raster dataset composed of pixels with each pixel having a pixel value. Pixel values in an observed image may represent some ground characteristic such as, for example, a plant, a field, or a structure. The characteristics and/or objects represented by the pixels may be indicative of the crop conditions within an agricultural field in the image.

The observation system 110 may provide images of an agricultural field over a network 140 to the network system 120, wherein said images may be stored in the image store 121. Additionally, or alternatively, imagery derivatives generated by the image filtering module 122, image processing module 123, or change detection module 124 may also be stored in the image store 121.

The image filtering module 122 inputs an observed image and outputs a filtered image. The observed image may be accessed from the image store 121 or directly received from the observation system 110. A filtered image is the observed image that has been filtered such that it can be processed by the image processing module 123 and utilized for field change detection in the change detection module 124.

The image processing module 123 takes filtered images provided by the image filtering module 122 and processes them through to derivative products needed by the change detection module 124.

The change detection module 124 uses the image derivatives provided by the image processing module 123 to detect changes in the crop condition within an agricultural field. If certain criteria are met, the change detection module will generate a notification to be transmitted to the client system 110 via a network 140.

Image Filtering

Filtering of images provided by the observation system 110 or retrieved from the image store 121 is performed using the image filtering module 122. Image filtering is performed to ensure images are suitable for use in automated crop health change detection.

There are numerous reasons why an image may be unsuitable for change detection. Pixel values in an observed image obtained from a remote sensing platform are a measurement of electromagnetic radiation (EMR) originating from the sun (a quantity hereafter referred to as radiance), passing through the atmosphere, being reflected from objects on the Earth's surface (i.e., an agricultural field), then passing through part or all of the atmosphere once again before being received by a remote sensor (a quantity hereafter referred to as radiance). The proportion of radiance received by ground objects relative to the irradiance received by these objects (a measure hereafter referred to as surface reflectance) is of primary interest to remote-sensing applications, as this quantity may provide information on the characteristics of these objects. However, atmospheric effects can introduce detrimental impacts on the measured EMR signal in an observed image, which can render some or all of the image pixels inconsistent, inaccurate, and, generally untenable for use in accurate detection of crop health condition changes.

Atmospheric scattering and absorption is one major source of error in surface reflectance measurements. This effect is caused when molecules in the atmosphere absorb and scatter EMR. This scattering and absorption occurs in a wavelength-dependent fashion, and impacts EMR both during its initial transmission through the atmosphere, as well as after it is reflected from the Earth's surface and received by the remote sensing platform. Atmospheric absorption and scattering can cause various deleterious effects, including: some EMR from the sun not making it to objects on the ground; some EMR from the sun scattering back into the remote sensor before reaching the ground; and some EMR reflected from the ground not reaching the remote sensor. While the EMR output from the sun is well understood and relatively invariant, atmospheric scattering and absorption can vary markedly both over time and space, depending on the type and amount of atmospheric molecules and the path length of the EMR transmission through the atmosphere.

One adjustment for atmospheric effects is a correction of raw image data to top-of-atmosphere (TOA) reflectance units, a quantity hereafter referred to as TOA reflectance. This correction converts the radiance measured by the sensor to TOA reflectance units expressed as the ratio between the radiance being received at the sensor and the irradiance from the sun, with a correction applied based on the path of the EMR both from the sun to the target and from the target to the remote sensor. This first-order correction can mitigate for some broad temporal and spatial attenuation of EMR transmission from the atmosphere, but it does not account for the variable absorption and scattering, which can occur from variations in the atmospheric constituent particles.

A second-order correction, referred to here as atmospheric correction, attempts to mitigate and reduce the uncertainties associated with atmospheric scattering and absorption. A range of atmospheric correction techniques of varying complexity have been employed within the field of remote sensing. These techniques are well known to a person skilled in the art and are consequently not further discussed here. The end result from atmospheric correction is an estimate of surface reflectance. To mitigate the impact of atmospheric scattering and absorption, in some embodiments the image filtering module 122 may employ either TOA or atmospheric correction techniques.

Another source of uncertainty, which may impact observed image quality, is the presence of atmospheric clouds or haze and shadows cast from clouds, which can occlude ground objects and/or attenuate the radiance reflected from these objects. As such, the image filtering module 122 may utilize a cloud and/or shadow masking technique to detect pixels afflicted by these effects. Many techniques exist within the discipline for cloud and shadow masking and are also well known to a person skilled in the art.

The image filtering module 122 may also remove pixels from an observed image (e.g., using cropping, selective deletion, etc.). For example, an observed image may include obstacles or structures (e.g., farm houses, roads, farm equipment) that may be detrimental to assessment of the condition of crops within the field. The image filtering module 122 removes the impacted pixels by, for example, cropping out pixels from the observed image. Pixels impacted by clouds, shadows, and/or haze as detected by a cloud and shadow detection algorithm can also be removed in a similar fashion. The resulting image as an image that provides more accurate data for detection of change in the health condition of the crops.

In some cases, the number of deleterious pixels in an image may exceed some critical threshold, thereby preventing the image from being useful in change detection. Similarly, some images may lack full coverage of an agricultural field of interest. In such cases, the image filtering module 122 may remove an image from further processing and it will not be used in change detection.

Images that have been processed through the image filtering module 122 are hereafter referred to as filtered images.

Image Processing

Filtered images are passed from the image filtering module 122 to the image processing module 123. The image processing module processes the filtered images into derivatives needed by the change detection module 124.

The image processing module 123 computes vegetation indices (VIs) from input filtered images. Vegetation indices are derivatives created through mathematical operations performed on different image spectral bands, wherein a spectral band represents reflectance data measured over a specific wavelength range of EMR. The result from a VI calculation is a new image where each pixel value corresponds with the VI value calculated from the original band values for that pixel in the original image. Vegetation indices have long been used for remote sensing of vegetation since they often demonstrate high correlations with vegetation properties of interest, such as biomass, photosynthetic activity, crop yield, etc. As an example, the image processing module 123 may compute the Normalized Difference Vegetation Index (NDVI). The NDVI is calculated as:

$$NDVI = \frac{NIR - \text{Red}}{NIR + \text{Red}} \qquad (1)$$

where NIR is the image reflectance in the near infrared (NIR) band, and Red is the image reflectance in the Red band. The NDVI is expressed as a decimal value between −1 and 1. NDVI values in the range of 0.2 to 0.8 or higher are typically considered an indication of active vegetation, with higher values being correlated with higher biomass, photosynthetic activity, etc. While the NDVI has been used in this example embodiment, other embodiments may utilize any other vegetation index or combination of indices.

Higher VI values generally indicate favorable vegetation conditions including higher biomass, higher photosynthetic activity, and higher eventual yields. Relatedly, increases in VI values from one image to the next may indicate an increase in any such favorable vegetation conditions, and decreases may, conversely, indicate a deterioration in vegetation condition. Increases in VI values may also indicate weed growth in the field.

The image processing module 123 may also compute image statistics, which are used to compute other derivatives and portions of the change detection process. These statistics may include the mean, median, and standard deviation for the filtered image spectral bands and any derivative VIs.

Figure 2:
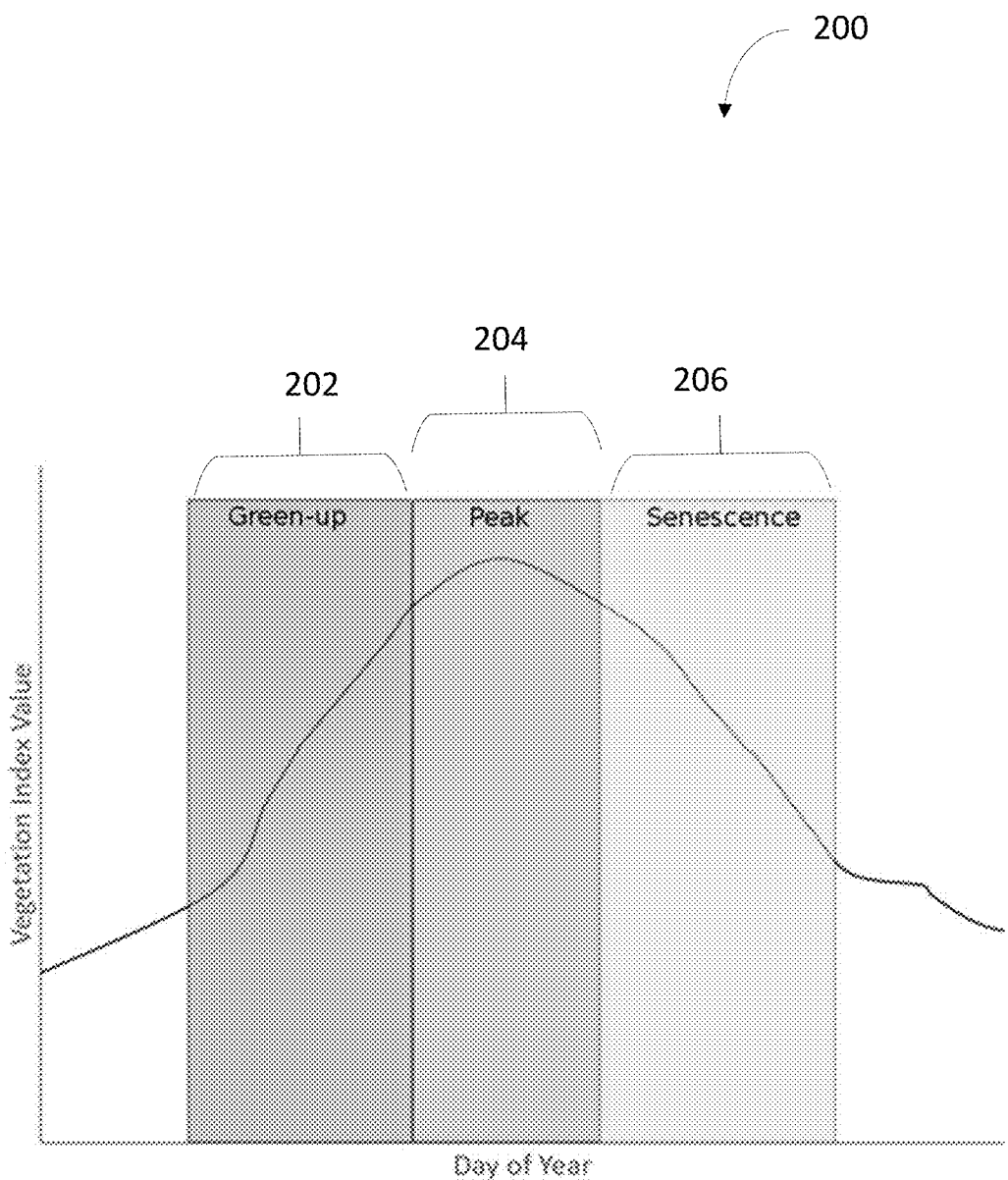
FIG. 2 illustrates a generalized growth curve for an exemplar crop as expressed through vegetation index values.

While increases and decreases in VI values in an agricultural field may indicate deleterious effects warranting the attention of the grower, there are other potential causes that need not trigger an alert to be generated. As an example, consider the seasonal growth pattern of a typical agricultural crop. Following planting, a plant will germinate and grow during the course of the season, increasing in both biomass and photosynthetic activity (green-up phase) before reaching a plateau (peak phase), followed by a gradual yellowing of the plants prior to harvest (senescence phase). FIG. 2 is a graph 200 which illustrates a generalized growth curve for an exemplar crop as expressed through vegetation index values. The green-up phase 202 is typified by a continuous increase in VI values, while the peak phase 204 sees a leveling off of the VI values, and finally the senescence phase 206 is marked by a gradual decrease in VI values over time. These seasonal increases and decreases are part of the regular plant growth cycle and are not of any particular concern to growers; however, direct change detection between VI images computed during the green-up or senescence phases may trigger an alert to be generated. There are other potential causes of increases/decreases in VI values not directly related to changes in crop health condition. As mentioned previously, differences in atmospheric constituents from one day to another can cause changes in band reflectance values and consequently VI values. While some level of correction of these effects is possible, it is difficult to fully correct, especially in an automated fashion. Finally, if different imaging platforms are used (i.e., different satellites in a constellation), there may be differences in calibration between them that cause differences in reflectance values, and consequently the VI values between images acquired by each platform.

To mitigate potential differences in VI values from one image to the next, unrelated to changes in field conditions, the image processing module 123 may also compute normalized vegetation index products from the earlier calculated vegetation index images. These images normalize the individual pixel values within a given VI image based on a statistical measure of central tendency (i.e., the mean or median value). For example, a normalized NDVI image may be computed by the image processing module 123 as follows:

$$\text{NormNDVI} = \text{NDVI}_{pixel} - \text{NDVI}_{median} \qquad (2)$$

where NormNDVI is the normalized NDVI value for a given pixel, $\text{NDVI}_{pixel}$ is the original NDVI value for the pixel, and $\text{NDVI}_{median}$ is the median NDVI value for the entire NDVI image.

The use of normalized VI images for the change detection phase can help to compensate for increases and decreases in the VI values between one image and the next due to issues including regular crop growth cycles, differences in atmospheric conditions, and differences in remote sensor calibration.

The final derivative that may be produced by the image processing module 123 is a classified normalized VI image. This makes use of a classification scheme to break the continuous normalized VI pixel values into discrete classes. In an example embodiment, the classification scheme may appear as in Table 1:

TABLE 1

Example Classification Scheme for a Normalized NDVI Image

| Normalized NDVI Range | New Classified Value |
| --- | --- |
| $X \leq -0.075$ | 1 |
| $-0.075 < X < -0.025$ | 2 |
| $-0.025 \leq X \leq 0.025$ | 3 |
| $0.025 \leq X \leq 0.075$ | 4 |
| $X \geq 0.075$ | 5 |

After creation of the classified image, the area of each class is computed. This computation is performed by calculating the number of pixels within a given class and multiplying by the area represented by a single pixel.

All image processing stages are performed on every filtered image entering the image processing module. All image processing derivatives may then be stored in the image store 121 to be accessed in subsequent change detection runs, stored in the computer memory, and/or recomputed as required.

Change Detection

The change detection module 124 is used to detect changes in a field's crop health condition using the imagery products derived from the image processing module 123. Change detection can examine either positive change or negative change. Positive change looks for increases in normalized VI values between image pairs and can be useful for locating areas of plant growth, which could be indicative of weed growth in a field. Negative change looks for decreases in normalized VI values between image pairs and can be useful for locating areas where the relative crop condition is declining due to various crop ailments such as disease, weather damage, pest damage, poor nutrient content, and so on. The change detection process is the same for either positive or negative change; only the specific parameters and thresholds utilized may change.

Figure 3:
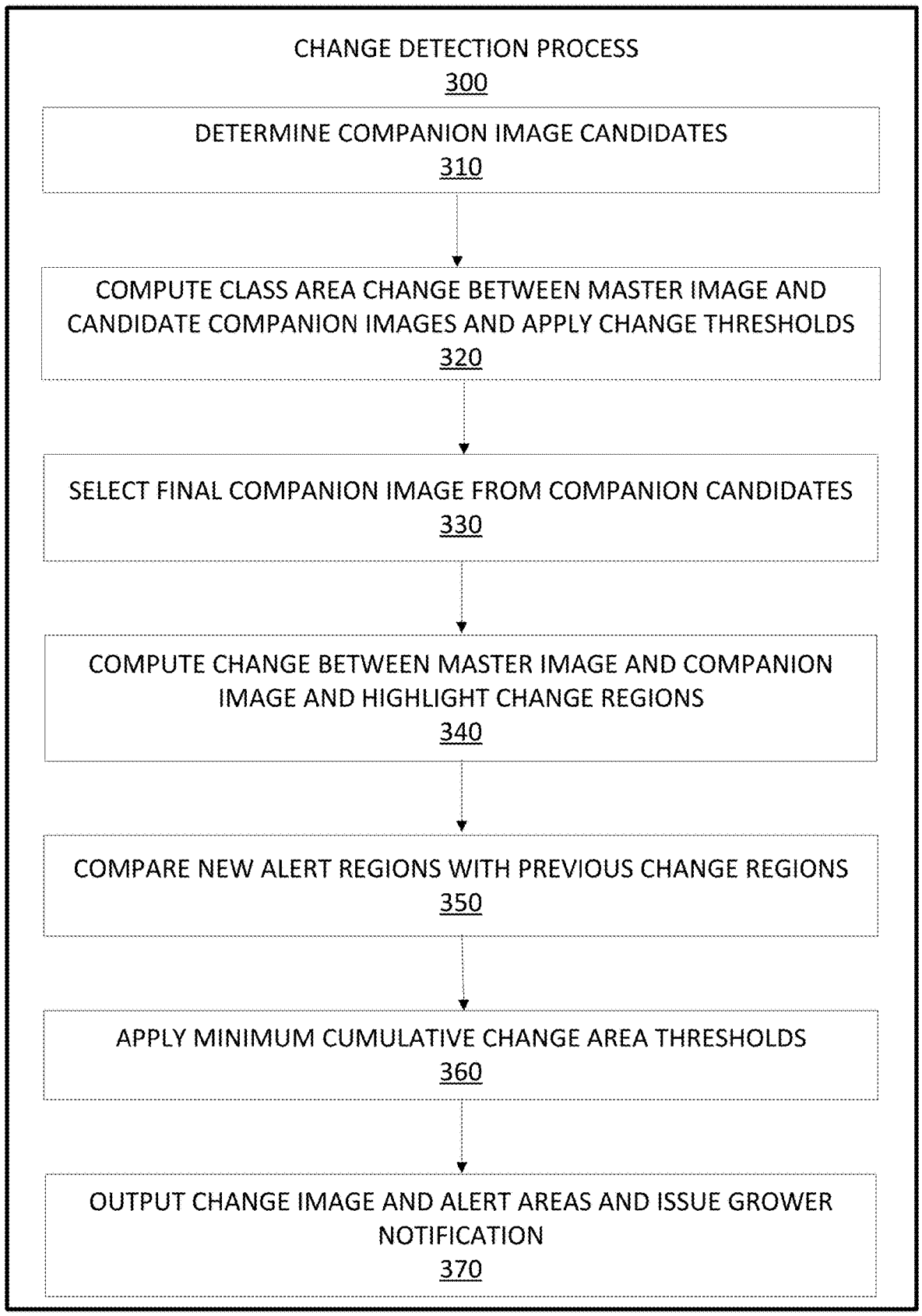
FIG. 3 illustrates the process for detecting crop condition change in an agricultural field, according to one example embodiment.

FIG. 3 illustrates the process for detecting crop condition change in an agricultural field. The change detection process 300 is executed by the change detection module 124 for a specific image in a sequence of filtered images over a specific agricultural field. This can be the most recent filtered image, or any filtered image in the sequence of filtered images (hereafter referred to as the image stack), or the process can be run sequentially on every image in the stack. Most typically the process will be run sequentially through the image stack within a specified time of interest (i.e., from the beginning of the crop season to the most recent image date), beginning with the oldest image in the stack and proceeding until the most recent image is processed.

The current image being processed is hereafter referred to as the "master image." Change detection is run between the master image and another image acquired at some point in the past relative to the master image date, an image hereafter referred to as the "companion image."

Step 310 selects potential companion images from the stack of images acquired on dates previous to the current master image date. The selection of candidate images is based on a date range parameter, with companion candidates needing to be acquired within a specified number of days of the master image date (i.e., candidates must be within 14 days of the master image date). The date range parameter can be utilized in order to ensure change detection is being run between pairs of images under comparable field conditions, avoiding potentially problematic comparisons, such as comparing an image acquired during senescence with an image acquired prior to crop growth. Note that in other embodiments, additional or alternative candidate selection criteria could be applied to further narrow down the list of companion candidates. As an example, a minimum/maximum threshold for the average VI value in the field could be used in an attempt to ensure actively growing vegetation is present in the field. Alternatively, if growth stage data (modelled or observed) were available for the field, then companion candidate images could be selected if they fall within a specified growth stage.

If no valid companion images are found, the change detection process for the current master image ends. If one or more candidate companion images are found, step 320 computes the change in classified areas between the master image and all companion candidates. Once the area change is computed, class area change thresholds are applied. These areas change thresholds can be applied to the individual classes, or to a combination of class area changes. Equations 3-6 provide a sample scheme for negative change class area thresholds, while Equations 7-8 provide a sample scheme for positive change class area thresholds, based on the classes outlined in Table 1.

$$\text{Class 1 Change} \geq \text{Change Threshold 1} \Rightarrow \text{Potential Alert} \quad (3)$$

$$\text{Class 1 Change} + \text{Class 2 Change} \geq \text{Change Threshold 2} \Rightarrow \text{Potential Alert} \quad (4)$$

$$(\text{Class 1 Change} + \text{Class 2 Change}) - (\text{Class 4 Change} + \text{Class 5 Change}) \geq \text{Change Threshold 3} \Rightarrow \text{Potential Alert} \quad (5)$$

$$(\text{Class 4 Change}*-1) + (\text{Class 5 Change}*-1) \geq \text{Change Threshold 4} \Rightarrow \text{Potential Alert} \quad (6)$$

$$\text{Class 4 Change} + \text{Class 5 Change} \geq \text{Change Threshold 5} \Rightarrow \text{Potential Alert} \quad (7)$$

$$\text{Class 5 Change} \geq \text{Change Threshold 6} \Rightarrow \text{Potential Alert} \quad (8)$$

If no change thresholds are exceeded, the change detection process for the current master image ends. If one or more thresholds are exceeded for a single companion image candidate, then step 330 is skipped. If one or more thresholds are exceeded for multiple companion image candidates, step 330 is used to select a single companion image from the eligible companion candidates. Numerous selection methods are possible. In an embodiment, the percentage by which each threshold was exceeded in each image is computed as follows:

$$ThresholdExcess = \frac{ClassAreaChange - ChangeThreshold}{ChangeThreshold} * 100 \quad (9)$$

where ClassAreaChange is the change in area for a particular class or combination of classes as computed from any of Equations 3-8, and ChangeThreshold is the minimum area threshold for that class or combination of classes. To select a single image from multiple candidates, the ThresholdExcess percentages are compared, and the image with the highest ThresholdExcess value is selected as the alert comparison image.

Figure 4:
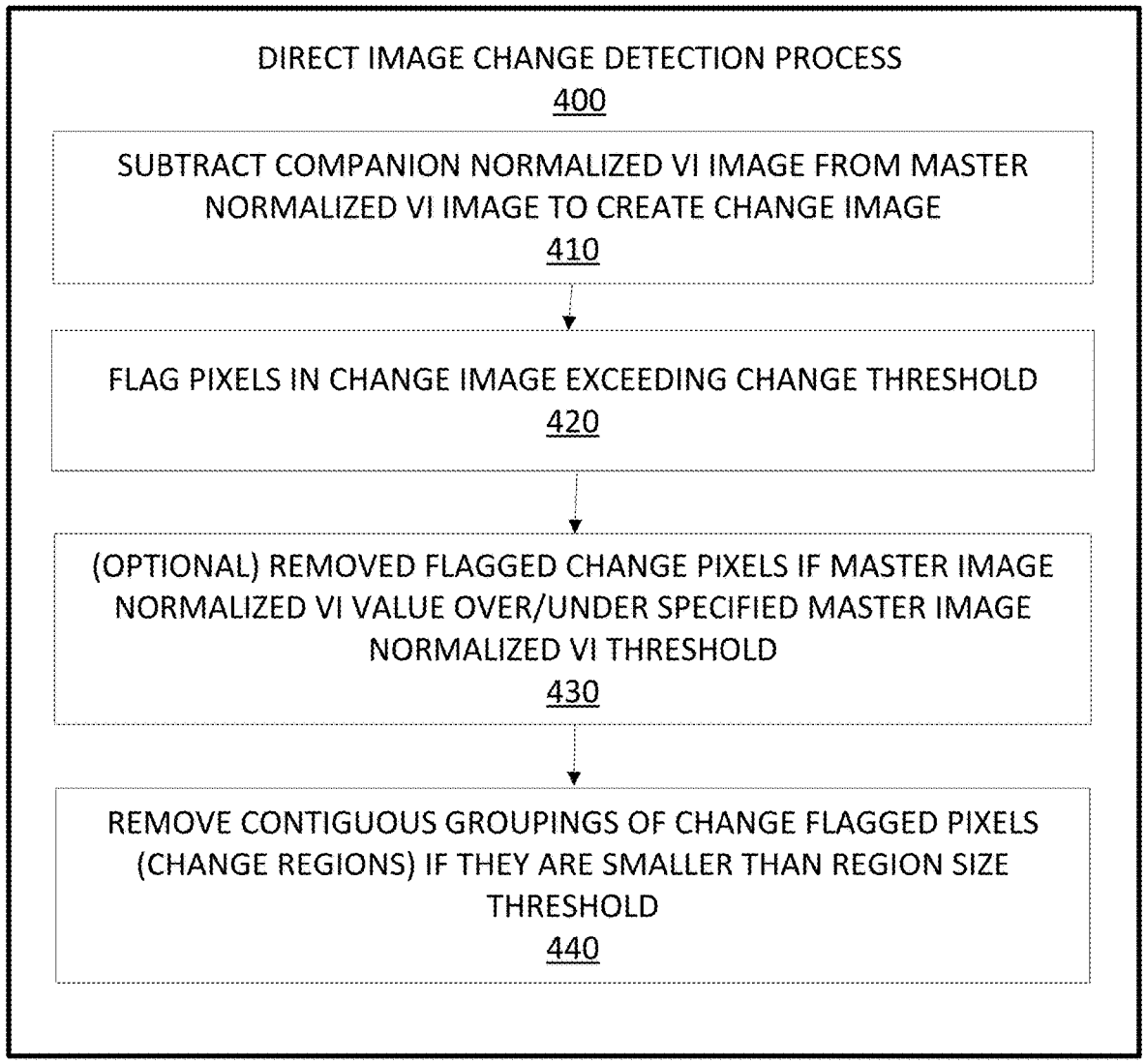
FIG. 4 illustrates the process for direct change detection between two images, according to one example embodiment.

Once a single companion image is selected, direct change detection between master and companion normalized VI images occurs in step 340. FIG. 4 illustrates the process for direct change detection between two images. Process 400 in FIG. 4 is similar to the process in step 340 in FIG. 3. First, the companion image normalized VI image is subtracted pixel-wise from the master image normalized VI image (step 410). This creates a new image, hereafter called the "change image", where each pixel value represents the change in normalized VI value between the companion and master image.

Next, at step 420, a change threshold is used to flag pixels in the change image, which represent significant change. The threshold used is a negative value for negative change detection, and positive for positive change detection. To illustrate, if performing negative change detection with a threshold value of −0.03, any pixels with a change value of −0.03 or less would be flagged as significant negative change pixels. If performing positive change detection with a threshold value of 0.05, any pixels with a change value of 0.05 or greater would be flagged as significant positive change pixels.

Step 430 is an optional step for filtering the significant change pixels flagged in step 420. This additional filtering is performed using the master image normalized VI image, wherein pixels flagged in the change image have their master image normalized VI values assessed. Flagged change pixels with a normalized VI value over or under a specified threshold are removed. This additional step may reduce the possibility of highlighted areas of change corresponding with healthy vegetation. To illustrate, consider a case where, due to favorable conditions, a certain portion of an agricultural field begins growing earlier than the rest of the field. Initially this area will likely have a large positive normalized VI value in images, as the VI values in this area exceed the field average. As the crops in the rest of the field grow, they will "catch up" with the early-growth region, causing the normalized VI value in the early-growth region to decline as the field average increases. Depending on the severity of the decline, this portion of the field may be flagged in a negative change alert. Yet the crops in this area may be perfectly healthy, causing the generated alert to be considered as a false positive. By using the master image normalized VI image, a threshold can be applied to only flag change pixels if the master image normalized VI value is negative; thus, only regions of change that are performing below average in the master image are flagged. This would avoid the early-growth region described above from being highlighted in a change alert.

Figure 5:
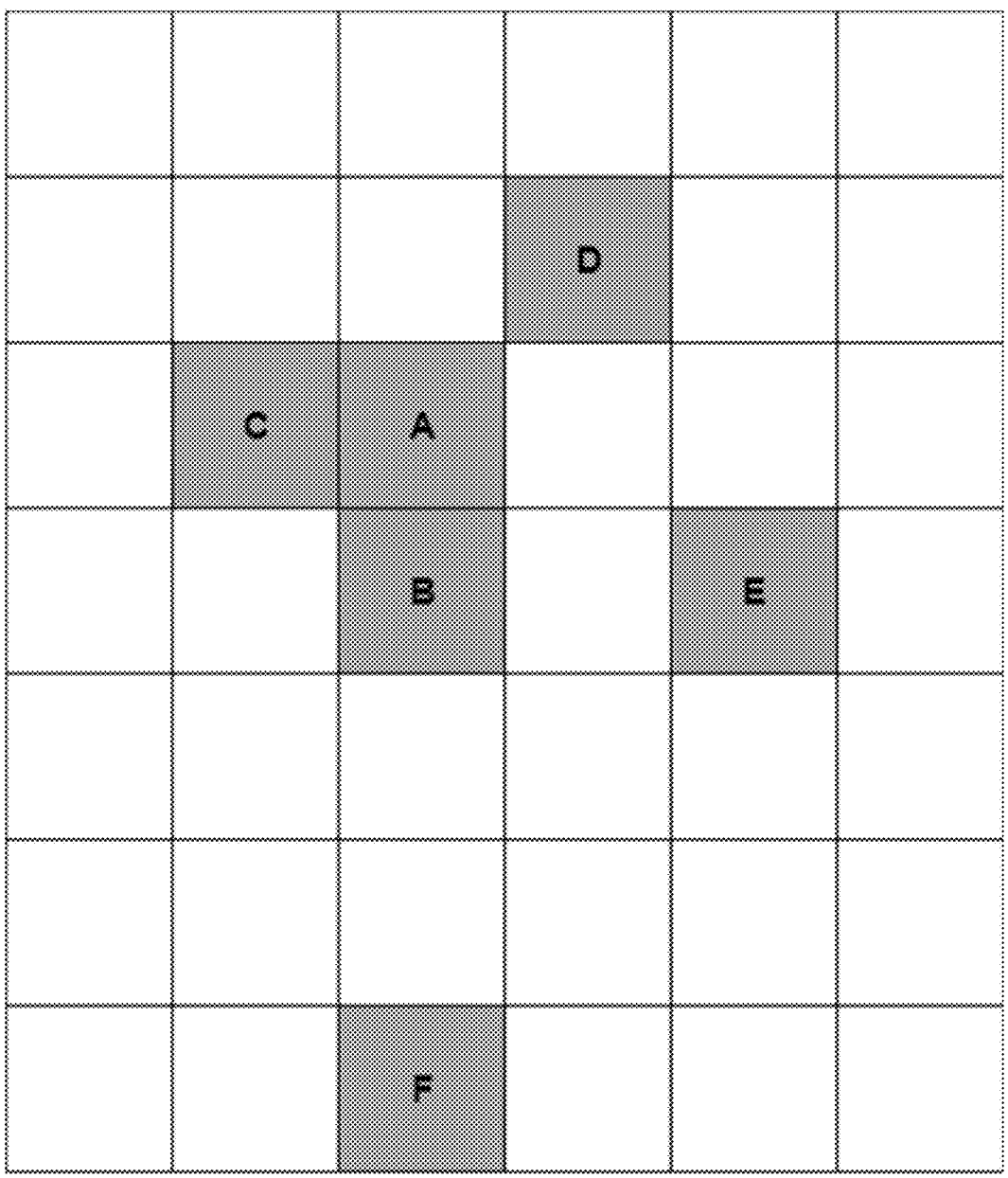
FIG. 5 illustrates an example of a pixel grid, with the highlighted labelled pixels representing flagged change pixels.

Following the flagging of change pixels in step 420 and the optional additional filtering in step 430, step 440 may be used to filter out isolated, small groupings of change pixels. This step is performed for a number of reasons: firstly, very small groupings of change pixels may likely be attributable to image noise/uncertainty in either or both of the images being compared, rather than any real change in the field. Secondly, due to their small size, these very small groupings of pixels may not represent any actionable intelligence for the grower. Finally, the presence of small isolated groupings of change pixels may make the final change alert image appear overly messy and obscure the broader trends in the data. This filtering is performed using a minimum size threshold, where the area of contiguous pixel groupings must exceed the threshold. A "contiguous grouping" of change pixels are those pixels that are considered to be spatially connected. Depending on the embodiment, the rules for connection can vary. FIG. 5 illustrates an example of a pixel grid, with the highlighted labelled pixels representing flagged change pixels. One connection rule only considers pixels that are immediately adjacent in the 4 cardinal directions to be connected. Using this rule, the pixels labelled "A," "B," and "C" would be considered connected, while "D," "E," and "F" are not connected. Another potential rule would consider all adjacent pixels in all 4 cardinal directions as well as the 4 diagonal directions surrounding a pixel to be connected. Using this rule, the "ABC" grouping of pixels would include "D" as well. Another potential rule may allow up to one pixel of separation between flagged pixels. Using this rule, the pixel labelled "E" would be included in the "ABCD" grouping.

Referring back to FIG. 3, once the direct change detection process is completed, after the minimum area filtering, it is possible that no contiguous groupings of change pixels (hereafter referred to as "change regions") are left. In this case, the change detection process for the current master image ends. If some change regions remain, Step 350 is used to compare the new change regions with change regions from previous change alert images. The rationale for comparison with previously-generated change regions is to avoid or reduce the potential for repeatedly alerting growers to problems in their field that they have already been notified to previously. In an embodiment, this comparison is performed against all change regions generated from master images within a specified date range from the current master image (i.e., within seven days). Portions of the current change regions, which were included in previous alert regions, may then be removed, or be otherwise flagged as having been included in previous change alerts.

Other comparisons with previously generated change regions are possible in addition to or instead of the above in order to further refine the current change regions. For example, a comparison may be performed between the current change regions and all previous change regions, not just those within a specified date range from the current master image. From here, step 350 may count the number of times a pixel was flagged in previous alert images, and remove it from the current alert image if it has been flagged too many times (i.e., remove a flagged pixel if it was included in previous alert images more than three times). This comparison may prevent notifying growers of problems in their field that they have already been made aware of, particularly problems that are not actionable, such as poor crop condition near the entrance to a field, where farm equipment regularly enters and leaves.

If any change pixels were removed as a result of step 350, the spatial filtering of contiguous change regions may be repeated here, following the logic described in step 420.

In step 360, minimum cumulative change area thresholds are applied to decide whether or not to issue a new change alert. This step is taken to avoid issuing many change alerts to growers wherein only very small portions of the field are highlighted in each. In an embodiment, new change regions are those groupings of change pixels which were not flagged in any previous alert images compared in step 350. If no previous alert images were compared, then all change regions are considered new. The cumulative area of the new change regions is calculated, and a minimum cumulative change area threshold is applied. If the cumulative area of the new change regions is less than the threshold, then the change detection process ends, and no change alert is issued.

If recent previous alerts were compared in step 350, a second threshold may also be applied. This threshold is a minimum percentage growth threshold, which requires the cumulative new alert area to be greater than a specified percentage of the cumulative area of the recent previously generated change regions compared in step 350. This percentage growth is computed as follows:

$$\text{Change Area Percent Growth} = \frac{\text{New Change Area} - \text{Previous Change Area}}{\text{Previous Change Area}} * 100 \quad (10)$$

where New Change Area is the cumulative area of the new change regions, and Previous Change Area is the cumulative area of the recent previously generated change regions compared in step 350. If the Change Area Percent Growth does not exceed the specified percentage threshold, the change detection process ends here, and no change alert is issued.

If the thresholds in step 360 are exceeded, then a crop health change alert may be issued to the grower (step 370). The alert may be issued as a notification, which is transmitted to a client system 130 over a network 140. A change alert image may also be generated and stored in the image store 121. The notification sent to the grower may also include the change alert image directly or may direct growers to a method for viewing the change image. If comparisons with previous change alerts were performed in step 350, the highlighted change regions in the change image may include all change pixels from the current change alert, or only those pixels representing new change regions, which were not included in previous change alerts.

Figure 6:
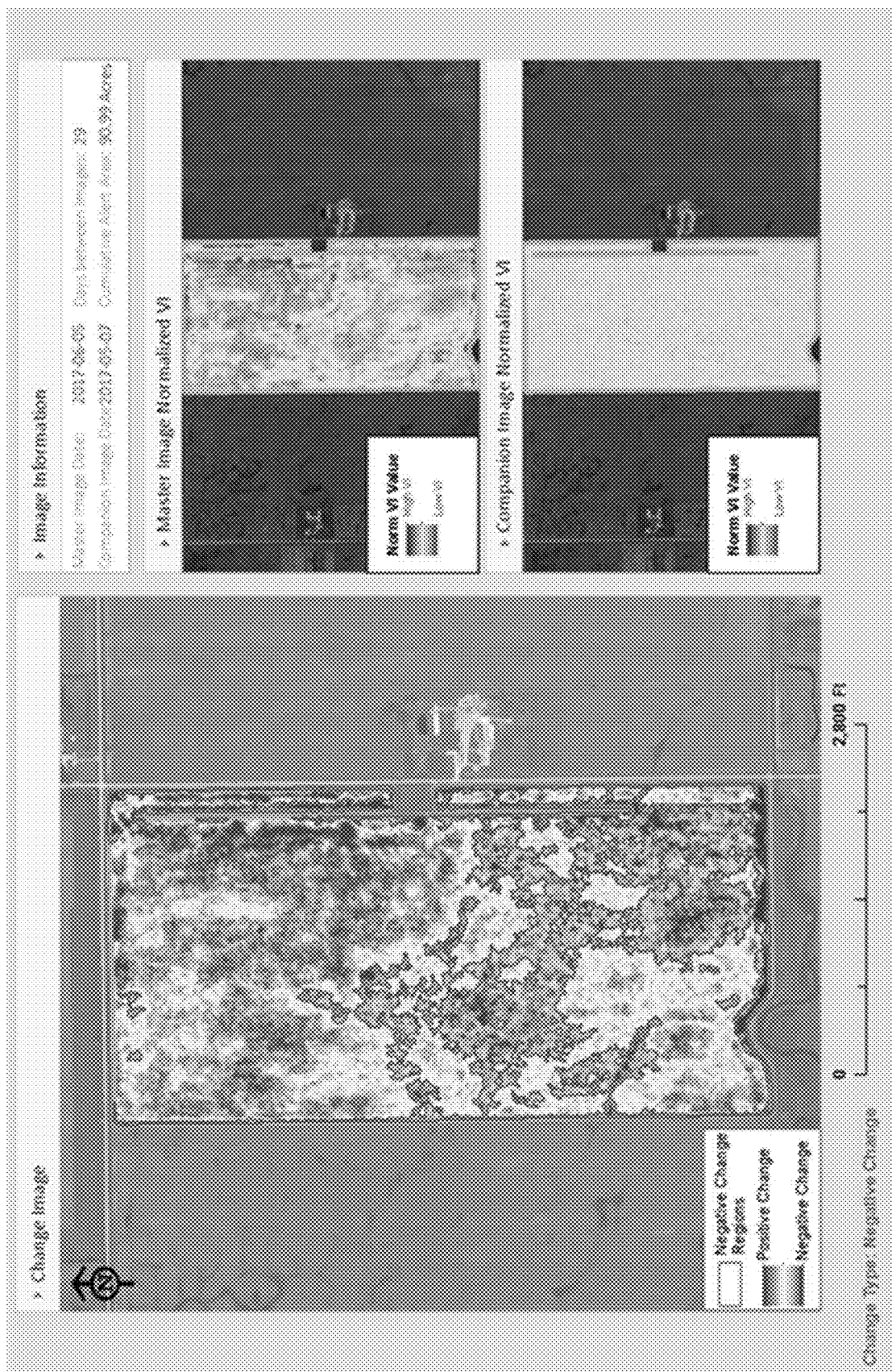
FIG. 6 illustrates an example of a change alert image generated by the change alerting system of the present invention.

FIG. 6 illustrates an example of how a change alert image generated by the change alerting system may appear. In FIG. 6, the larger image is the change image, shown in a divergent red-white-green color scheme, where red tones indicate negative change, green tones indicate positive change, and white tones indicate neutral areas with minimal change. Overlaid on the change image are the regions of significant change, shown as a blue outline. The smaller images show the normalized VI layers for the master and companion images. These images use a red-yellow-green color scheme, with below-average VI values shown as red tones, VI values close to average shown as yellow tones, and above-average VI values shown as green tones.

Example Computer System

Figure 7:
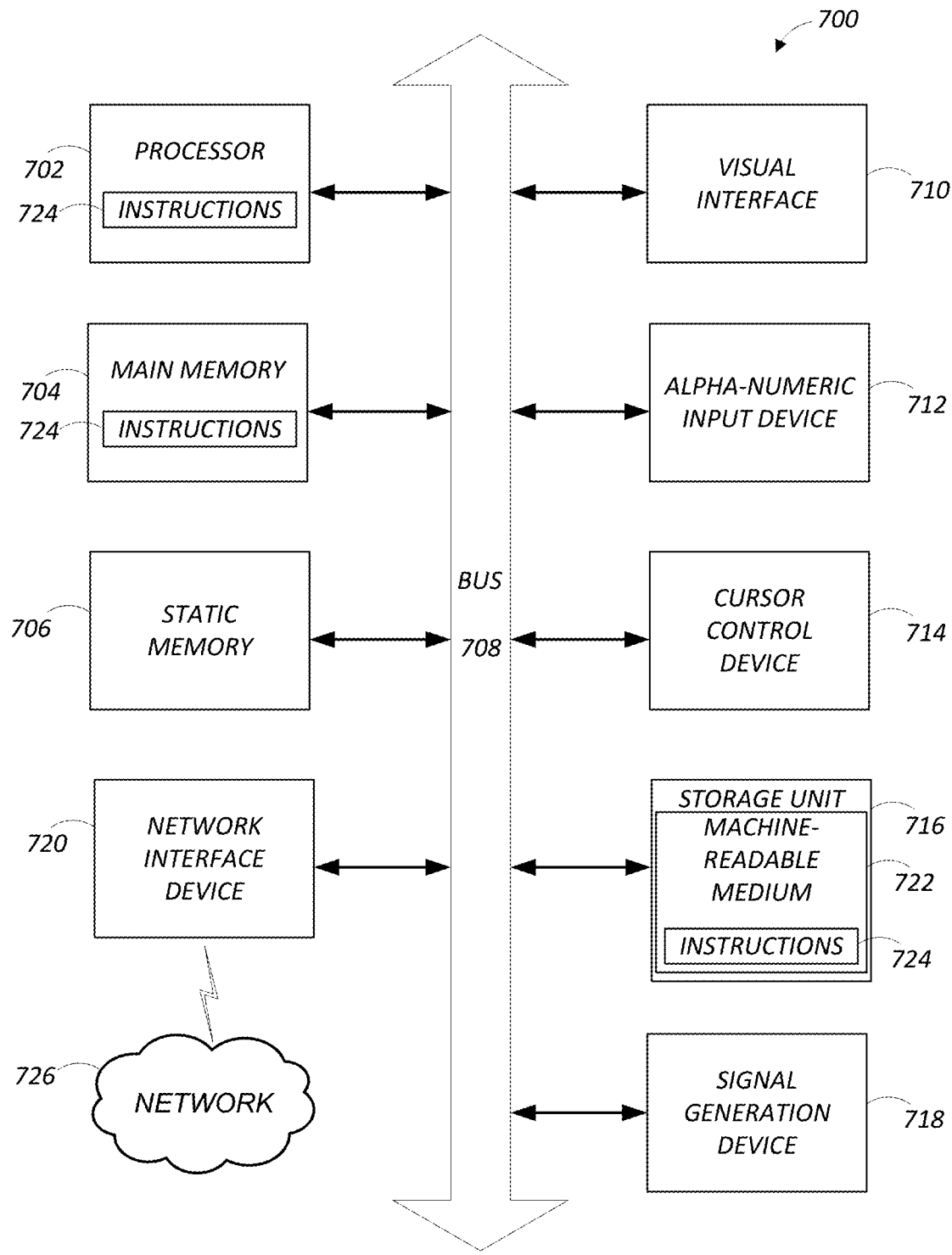
FIG. 7 is a block diagram illustrating components of an example machine for reading and executing instructions from a machine-readable medium, according to one example embodiment.

FIG. 7 is a block diagram illustrating components of an example machine for reading and executing instructions from a machine-readable medium. Specifically, FIG. 7 shows a diagrammatic representation of network system 120 and client device 130 in the example form of a computer system 700. Thus, the computer system implements the method 300 of FIG. 3. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the client device 130 or network system 120 described in FIG. 1. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 (e.g., network 120) via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but is not be limited to, data repositories in the form of solid-state memories, optical media, and magnetic media.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for systems, methods, and apparatus for monitoring crop conditions within agricultural fields. For example, differences in the manner in which images are obtained are contemplated including satellite imagery, aerial imagery from drones, or other types of imagery. Variations in specific image processing algorithms are contemplated. Variations in the types of vegetation indices used are contemplated. Various steps described in processing are optional and need not necessarily be performed in a particular embodiment. Other variations are contemplated as may be appropriate based on a particular crop, particular images used, available computing resources, or other factors. Thus, while particular embodiments and applications have been illustrated and described, it is to be understood that the disclosed embodiments are not limited to the precise methodologies disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A method for crop health change monitoring, the method comprising:
   (i) acquiring a companion image of a crop growing within a field at a first point in time;
   (ii) acquiring a master image of the crop growing within the field at a second point in time, the first point in time prior to the second point in time;
   (iii) computing, using a processor, vegetation indices using the master image and the companion image;
   (iv) determining, using the processor, regions of change within the master image using the vegetation indices by:
      (a) subtracting a companion normalized vegetation index image from a master normalized vegetation index image based on the master image to create a change image;
      (b) flagging change pixels in the change image exceeding a change threshold; and
      (c) removing contiguous groupings of flagged change pixels in the change image responsive to the contiguous groupings being smaller than a region size threshold;
   (v) generating an alert indicative of a change in crop condition of the crop growing within the field between the first point in time and the second point in time responsive to change within one or more of the regions of change being sufficient to meet defined criteria;
   and (vi) communicating the alert indicative of the change in crop condition over a network to a computing device configured to receive the alert.

2. The method of claim 1 further comprising selecting the companion image from a stack of images based on at least one candidate selection criteria.

3. The method of claim 2 wherein the at least one candidate selection criteria comprises a date range parameter and at least one of a minimum threshold for an average vegetation index value in the field, a maximum threshold for an average vegetation index value in the field, and a growth stage parameter.

4. The method of claim 1 wherein the defined criteria comprises a minimum threshold.

5. The method of claim 1 wherein the alert comprises a change alert image indicative of the change in crop condition of the crop growing within the field between the first point in time and the second point in time.

6. The method of claim 1 further comprising removing flagged change pixels if a master image normalized vegetation index value associated with the master normalized index image base is over a specified master image normalized vegetation index threshold.

7. The method of claim 1 further comprising removing flagged change pixels if a master image normalized vegetation index value associated with the master normalized index image base is under a specified master image normalized vegetation index threshold.

8. The method of claim 1 further comprising acquiring the companion image by:
   determining companion image candidates;
   computing class area changes between the master image and the companion image candidates and applying change thresholds to the class area changes to determine one or more eligible images; and
   selecting the companion image from the one or more eligible images using candidate image selection criteria.

9. The method of claim 1 further comprising comparing the one or more of the regions of change with one or more regions of change of a previously generated alert to determine one or more regions of new change, the step of generating the alert responsive to change within one or more of the regions of change being sufficient to meet the defined criteria further comprising applying a minimum cumulative change area threshold to the one or more regions of new change.

10. The method of claim 1 further comprising applying image filtering to the master image and the companion image prior to computing the vegetation indices.

11. The method of claim 1 wherein the vegetation indices are normalized difference vegetation indices.

12. A method for crop health change monitoring, the method comprising:
   (i) acquiring a companion image of a crop growing within a field at a first point in time, the companion image being acquired by:
      (a) determining companion image candidates;
      (b) computing class area changes between the master image and the companion image candidates and applying change thresholds to the class area changes to determine one or more eligible images; and
      (c) selecting the companion image from the one or more eligible images using candidate image selection criteria;
   (ii) acquiring a master image of the crop growing within the field at a second point in time, the first point in time prior to the second point in time;
   (iii) computing, using a processor, vegetation indices using the master image and the companion image;
   (iv) determining, using the processor, regions of change within the master image using the vegetation indices;
   (v) generating an alert indicative of a change in crop condition of the crop growing within the field between the first point in time and the second point in time responsive to change within one or more of the regions of change being sufficient to meet defined criteria;
   and (vi) communicating the alert indicative of the change in crop condition over a network to a computing device configured to receive the alert.

13. The method according to claim 12 wherein the step of selecting the companion image from the one or more eligible images using candidate image selection criteria further comprises:
   computing for each of the one or more eligible images an excess value representative of an amount that the class area changes exceed the change thresholds; and
   selecting the eligible image having the excess value which is greatest.

14. A method for crop health change monitoring, the method comprising:
   (i) acquiring a companion image of a crop growing within a field at a first point in time;
   (ii) acquiring a master image of the crop growing within the field at a second point in time, the first point in time prior to the second point in time;
   (iii) computing, using a processor, vegetation indices using the master image and the companion image;
   (iv) determining, using the processor, regions of change within the master image using the vegetation indices;
   (v) generating an alert indicative of a change in crop condition of the crop growing within the field between the first point in time and the second point in time responsive to:

(a) change within one or more of the regions of change being sufficient to meet defined criteria; and (b) subsequent to comparing the one or more of the regions of change with one or more regions of change of a previously generated alert to determine one or more regions of new change, change within the one or more of the regions of new change being sufficient to meet a minimum cumulative change area threshold;

and (vi) communicating the alert indicative of the change in crop condition over a network to a computing device configured to receive the alert.

\* \* \* \* \*